United States Patent [19]

König et al.

[11] 4,114,962
[45] Sep. 19, 1978

[54] CONNECTING ELEMENT FOR INTRODUCING FORCES INTO A STRUCTURAL PART

[75] Inventors: Rudolf König, Ottobrunn; Klaus Brunsch, Weidach, both of Germany

[73] Assignee: Messerschmitt-Bölkow-Blohm Gesellschaft mit beschränkter Haftung, Munich, Germany

[21] Appl. No.: 730,972

[22] Filed: Oct. 8, 1976

[30] Foreign Application Priority Data

Oct. 14, 1975 [DE] Fed. Rep. of Germany ....... 2545929

[51] Int. Cl.² .................. F16C 33/00; B31C 13/00
[52] U.S. Cl. .................. 308/238; 156/172; 156/250; 428/107
[58] Field of Search ............. 156/169, 172, 173, 174, 156/181, 180, 175, 254, 264, 69; 308/237 R, 238; 188/218 XL; 74/572, 581, 579 R; 29/159 R, 159 A, 156.8 P, 156.8 B; 416/230, 134 A; 428/107, 109, 113, 292, 377; 192/107 M; 52/84; 244/123

[56] References Cited

U.S. PATENT DOCUMENTS

| | | | |
|---|---|---|---|
| 3,056,706 | 10/1962 | Knoppel | 156/169 |
| 3,632,460 | 1/1972 | Palfreyman et al. | 156/175 |
| 3,698,262 | 10/1972 | Rabenhorst | 416/230 |
| 3,737,694 | 6/1973 | Rabenhorst | 416/230 |
| 3,884,093 | 5/1975 | Rabenhorst | 74/572 |
| 3,890,749 | 6/1975 | Günther | 52/84 |
| 3,977,273 | 8/1976 | Ernst et al. | 156/169 |
| 4,038,885 | 8/1977 | Jonda | 416/134 A |

Primary Examiner—William A. Powell
Assistant Examiner—Michael W. Ball
Attorney, Agent, or Firm—Toren, McGeady and Stanger

[57] ABSTRACT

In forming a connecting element for use in introducing forces into a structural part, a continuous roving is removed from a source of supply, impregnated with a synthetic resin, and guided over a rotatable disk. Extending outwardly from each of the opposing faces of the disk is a removable bush. The roving is wound in layers on each face of the disk in an alternating manner. During the winding operation, as the disk rotates, the roving is secured in a recess on the circumferential periphery of the disk then it moves across one face of the disk into contact with the bush on that face and finally is secured in another recess spaced angularly from the previous recess. At this time the roving is displaced in the axial direction of the bushes toward the other face of the disk and the winding operation is repeated on the other face. By repeating these operations a multiple number of layers are displaced on each face of the disk. When the winding is completed, the roving is cut around the cicumferential periphery of the disk so that a connecting element including the wound sections of the roving and the bush is removed from each face of the disk. The connecting element is then secured to a structural part or stored for subsequent use.

30 Claims, 14 Drawing Figures

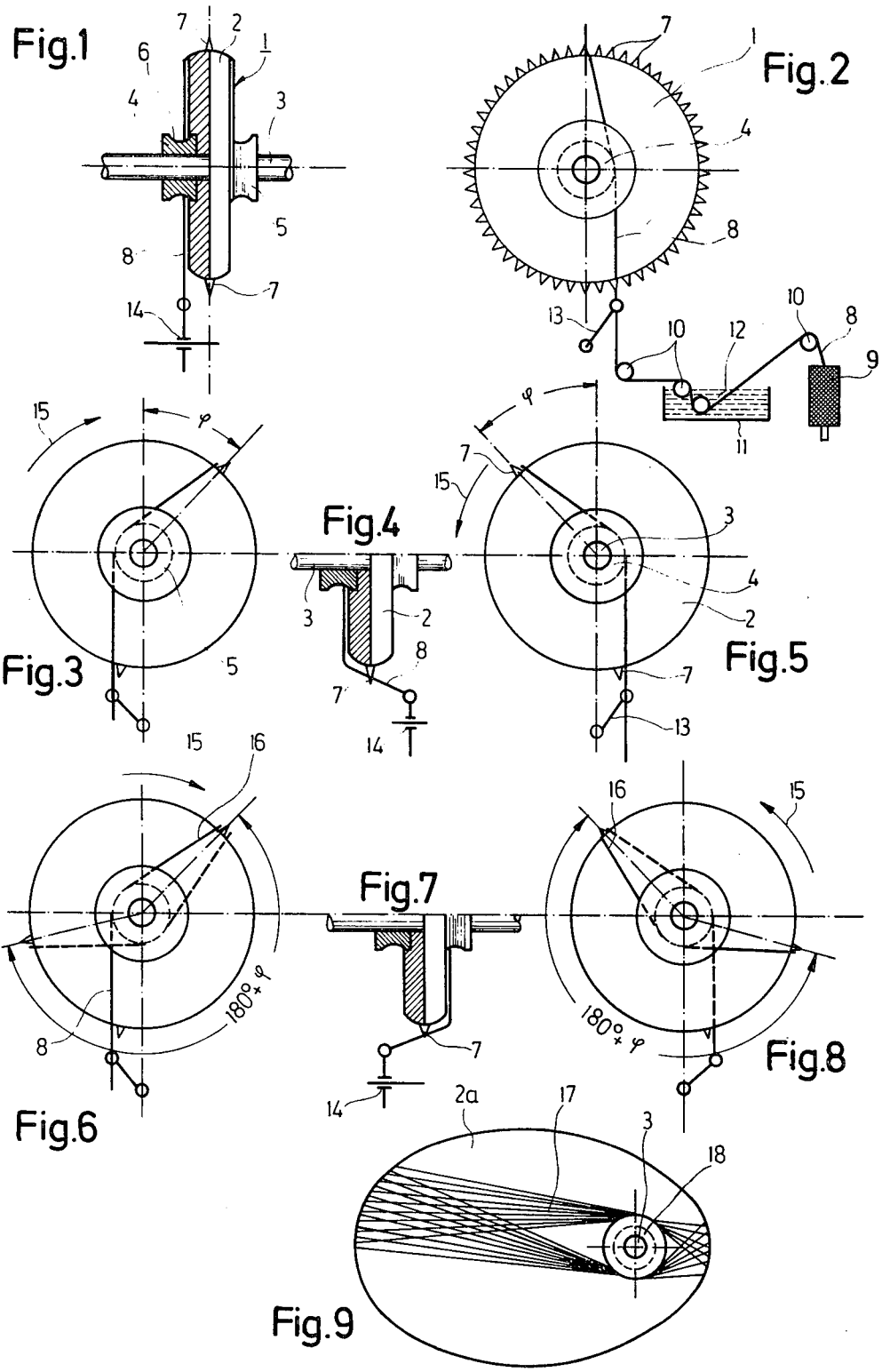

CONNECTING ELEMENT FOR INTRODUCING FORCES INTO A STRUCTURAL PART

SUMMARY OF THE INVENTION

The present invention is directed to a connecting element for introducing forces into a structural part and, more particularly, it concerns the structure of the connecting elements formed by inserting a bush into each of the opposite faces of a rotating disk and by winding a strand of fibers or a roving impregnated with synthetic resin onto the faces of the disk and into contact with the bushes.

The introduction of longitudinal and bending forces into connecting fittings of highly stressed light weight construction parts, particularly of the sandwich type, frequently encountered difficulties because the available connecting surfaces are too small or the shape of the connecting fittings is not favorable for transmitting the force. With the increasing use of fiber-reinforced plastics in extremely light weight arrangements for highly stressed structural parts, particular attention must be paid to the special properties of the fibers used for reinforcing which can withstand high tensile stresses, but are effective only for low shearing stresses.

In German Offenlegungsschrift No. 2,455,810 a connecting element of the above mentioned type has been suggested where the outer surface of an inner loop bears on a bush and is arranged inside an end loop formed by a roving placed about the bush. In such a connecting element, the two loops applied to the bush can transmit both tensile and shearing forces. The rovings forming the loops are manually applied about the bush. This type of connecting element is particularly suitable for lugs and end fittings of solid parts, where the entire cross-section is used for the transmission of forces, for example, for forming the roots of rotor blades. Such a connecting element is less suitable for the transmission of connecting forces to planar parts or to parts formed of a sandwich construction.

An arrangement for introducing forces into a planar part, particularly one of the sandwich construction, is shown in German Offenlegungsschrift No. 2,336,541, where, on one hand, the outer layers of the sandwich structure have an increased fiber reinforcement in the direction of the linking range of the part and, on the other hand, straps extend radially from the linking range between the outer layers. This arrangement affords a good solution for the problem of providing an overall structure which has optimum weight and strength characteristics, and it is particularly arranged to insure sufficient total strength in the event of damage or total destruction of the structure. Due to the use of a stepped thin covering of fiber-reinforced compound plates and straps extending radially between the outer layers of the sandwich structure, tapering from the connecting point this arrangement is both elaborate and expensive.

It is the primary object of the present invention to eliminate the disadvantages experienced in the known arrangements and to provide connecting elements which are simple to manufacture, permit a transmission of forces to an area, and can be used with solid parts as well as parts of a sandwich construction.

In accordance with the present invention, the problems faced in the past are solved using a connecting element of the above described type which is formed by winding fiber strands or a roving impregnated with a synthetic resin on a rotating winding disk which has a removable bush inserted into each of its opposite faces so that a first section of the roving is wound around one bush then passed over and held by a part of the circumferential edge of the disk and wound on the other side. This process is continued winding sections of the roving first on one side and then the other side until the winding operation is completed. The continuous roving is then divided along the circumferential peripheral edge of the disk into two symmetrical elements each consisting of a bush and the sections of the roving wound on one side or face of the disk.

Another characteristic of the invention is the reduction in the thickness of the wound layers of the roving which decreases from the bushes to the circumferential periphery of the disk. Further, the bushes can be inserted at varying depths into the disk and the circumferential periphery of each bush has an annular groove in which the sections of the roving are seated. The elements formed in this manner meet all of the requirements for connecting elements. Due to the winding technique employed, the fiber-reinforced plastic material is wound to a sufficient thickness about the bushes and terminates at the boundary line, defining the circumferential edge of the element in the form of a thin disk, as in a splice. High stresses from structural parts can be transmitted over a large area to connecting bolts guided in the bushes without any local stress concentration. The coiled arrangement of the roving according to the invention, from which two connecting elements are formed, can be produced manually for a smaller number of pieces, and mechanically using a winding machine for a larger number of pieces, and an extremely uniform winding operation is possible which assures the quality of the connecting elements.

As compared to prior fiber-reinforced structures, where fabric layers are laminated to achieve the desired reinforcement, and then bored or expanded for attachment to a connecting bolt, substantially greater forces can be transmitted with the connecting elements of the present invention, because the reinforcing fibers are not cut intermediate their ends and retain a defined position due to the winding arrangement.

Another characteristic of the invention is that the amount of the roving wound and the type of fibers and plastic material used can be selected in accordance with the forces to be transmitted. Therefore, it is within the intent of the concept to provide the number of layers of the wound strands corresponding to the forces to be transmitted and to the structure of the connections. Each of the materials available in rovings, for example, glass, carbon, graphite, boron, plastic and metal fibers can be processed for the production of the connection elements. Similarly, a wide variation of plastic materials can be utilized based on the fiber material employed and the required strength of the finished product, for example, by selecting fast or slow hardening resin compositions, resins with accelerators, saturated or unsaturated polyester resins and the like.

Moreover, in accordance with the invention, it is possible to adapt the circumferential form of the winding disk to the direction of transmission of the forces. As a result, not only can circular winding disks be used, which are expedient for the uniform introduction of forces in all directions into a finished connecting element, but also elliptical winding disks are usable, for example, where the bushes of the connecting elements are arranged at one of the focal points of the ellipse. The elliptical form of the connecting elements is preferred for the transmission of tensile forces which act substantially in the direction of the longitudinal axis of the ellipse, since a substantially greater portion of the fibers contribute to the transmission of the forces than when a round winding disk is used.

Preferably, the connecting elements are designed as pre-impregnated elements (prepregs) in accordance with another feature of the invention. Consequently, the connecting elements formed in accordance with the present invention can be impregnated during production in a known manner with a predetermined amount of the resin composition and can be hardened with further additions of the material under the application of heat, with or without pressure. Such elements can be produced economically for stock piling and, if necessary, can be connected by means of adhesive fibers.

The connecting elements can be used in many ways, since they are available as finished elements and can also be subsequently inserted to reinforce existing force-introducing devices.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a top schematic view, partly in section, of a winding device embodying the present invention;

FIG. 2 is a schematic side elevational view of the winding device shown in FIG. 1;

FIGS. 3-8 illustrate the various steps in winding a fiber strand or roving on the disk shown in FIGS. 1 and 2, with FIGS. 3, 5, 6 and 8 being schematic side elevational views and FIGS. 4 and 7 being half top views, partly in section;

FIG. 9 displays another embodiment of a coil form in accordance with the present invention.

DETAILED DESCRIPTION OF THE INVENTION

Figure 10:
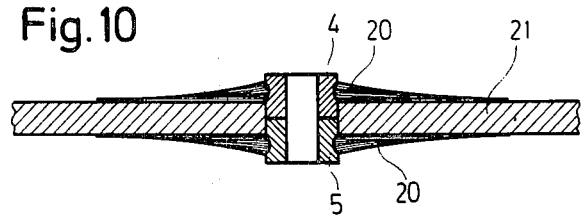
FIGS. 10 to 14 are cross-sectional views of various examples of the connecting elements, formed in accordance with the present invention, combined with a structural part.

In FIG. 1 a coil form 1 consists of a winding disk 2 driven by a shaft 3. Secured on the shaft are two removable bushes 4, 5 each of which has an annular groove formed in its circumferential periphery. Depending on the subsequent use to be made of the connecting element, the depth to which the bush is inserted into the winding disk can be selected. Positioned around the circumferential periphery of the winding disk 2 is a number of tooth-like members or dogs 7 providing recesses between adjacent dogs. The winding of the coil form is effected with a roving 8, formed of any suitable material, such as glass, carbon, boron, graphite, plastic or metal. Roving 8 is wound from a spool 9, passes over a guide roller 10 and then through a vessel 11 filled with a liquid synthetic resin 12 as it passes over additional guide rollers 10, then on to a guide arm 13 of a slide feed 14 into contact with bush 4. Passing chordally outwardly from bush 4 the roving fits between two dogs 7 and extends to bush 5 where its end is secured in a known manner. The liquid resin 12 can consist, for example, of 100 parts by weight of an epoxy resin of the type Araldit CY 209 and 25 parts by weight of a hardener of the type HT 972 both as supplied by Ciba.

With the roving secured to the combined winding disk 1 and bushes 4, 5, the first step of the winding process is illustrated in FIGS. 3 to 5. In FIGS. 3 and 5 the opposite faces of the winding disk 2 are shown in symmetrical position to each other. Winding disk 2 is driven continuously in a known manner, not shown, by shaft 3 in the direction of arrow 15. Starting from the 12 O'Clock position shown in FIGS. 3 and 5, after the rotation of the winding disk through an angle $\phi$, the slide feed 14 changes from the starting position shown in FIGS. 1 and 2, aligned below bush 4 moves to the opposite side or face of the winding disk 2 so that it is aligned with bush 5. As the disk continues to rotate, roving 8 is entrained by one of the dogs 7 and the slide feed 14, as shown in FIGS. 6 to 8, and again changes to the opposite side of the disk after the disk has rotated angularly for 180° + $\phi$. After these two first winding steps have been effected, a complete turn 16 has been applied to the winding disk 2. Continued winding takes place with the roving being displaced from one side or face of the winding disk to the other after the completion of each angular displacement of the disk of 180° + $\phi$. To obtain a uniform winding of winding disk 2 between all of the dogs 7, the angle $\phi$ must be selected so that the quotient of 360/$\phi$ is not a whole number.

When the winding of the roving 8 on the coil form 1 has been completed, the wound layers of the sections of the roving on each side of the winding disk are separated around the circumferential periphery along the line of the dogs 7. Next the bushes 4 and 5 with the layers of the fiber strands or roving wound thereon can be removed from shaft 3 and winding disk 2 providing two symmetrical connecting elements 20. It is possible in a known manner to process the connecting elements 20 immediately, to connect them to a structural part and harden them, or to store the elements as prepregs in the wet state at temperatures below room temperature and to use them when needed.

While the winding disk 2 in FIGS. 1 to 8 is shown with a circular circumferential periphery, it is also possible to use an elliptically shaped disk 2a, as shown in FIG. 9. In winding disk 2a, the shaft 3 is positioned at one focal point of the ellipse. As shown a number of turns 17 have been placed about a bush 18 mounted in the winding disk 2a. Connecting elements formed on such a coil form are particularly suitable for bearing lugs to be reinforced at the edge, as well as for connections where the forces act substantially in the direction of the longitudinal axis of the ellipse.

In FIG. 10 the simplest arrangement of a structural part in connecting elements is illustrated, where the bushes 4 and 5 of the connecting elements 20 are inserted into a structural part 21 and joined to the part by a cementing action. Structural part 21 can be made of any material.

Figure 11:
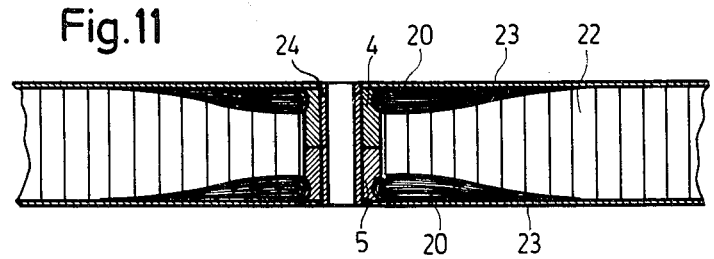
Figure 12:
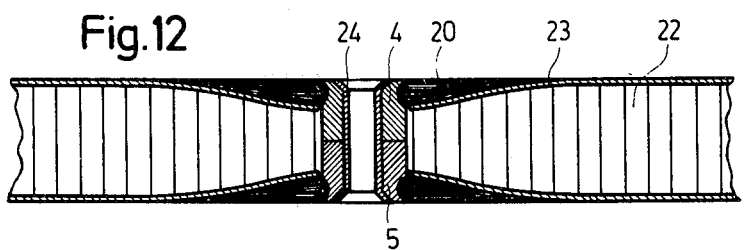

In FIGS. 11 and 12 an arrangement is shown for introducing connecting forces into a honeycomb core 22, the introduction of forces into such a structure has, until the present time, been extremely difficult, however, such introduction can be satisfactorily effected by means of the connecting elements 20 adapted to the stresses and the material involved. The honeycomb cores are either formed or milled out to receive the connecting elements 20 and preferably, they are provided with outer layers 23 which serve as terminal plates, note FIG. 11, or as illustrated in FIG. 12 the layers 23 can be positioned between the connecting elements 20 and the honeycomb core 22. In each of the two embodiments illustrated, the bushes 4 and 5 are provided with an inner bush 24. The outer layers 23 can be formed of any material, though preferably they are formed of plastic either with or without fiber reinforcement.

Figure 13:

FIG. 13 shows a similar arrangement where the connecting elements 20 introduce forces into a part 25 formed of fiber reinforced plastic or of a compound material. In this way or in a similar manner the bearing of a connecting point for a highly stressed light weight construction material in airplane or missile engineering could be designed.

Figure 14:
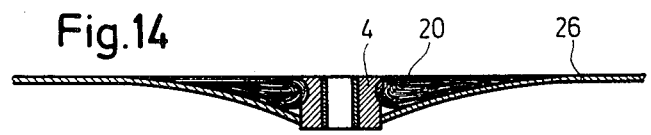

In FIG. 14 an arrangement is shown which makes it possible to introduce bearing forces into a very thin-walled part, for example housing wall 26, by means of a single connecting element 20. This embodiment effectively illustrates the areal distribution of the forces from the connecting bush 4 over the connecting element to the housing wall 26.

While specific embodiments of the invention have been shown and described in detail to illustrate the application of the inventive principles, it will be understood that the invention may be embodied otherwise without departing from such principles.

What is claimed is:

1. A connecting element for introducing forces into a structural part comprising a bush having a central axis, said bush having a circumferential outer surface extending in the direction of its central axis, a multiplicity of roving sections impregnated with synthetic resin each contacting the circumferential outer surface of said bush and extending chordally outwardly from opposite sides of said bush and terminating at spaced points along an endless boundary line spaced radially outwardly from and extending around said bush, the oppositely extending sections of each said roving being angularly disposed relative to one another.

2. A connecting element, as set forth in claim 1, wherein said rovings being arranged in a number of layers with the thickness of the layers decreasing outwardly from said bush to the endless boundary line.

3. A connecting element, as set forth in claim 2, wherein said boundary line is circular.

4. A connecting element, as set forth in claim 2, wherein said boundary line is elliptical.

5. A connecting element, as set forth in claim 2, wherein said bush is centrally disposed relative to said boundary line.

6. A connecting element, as set forth in claim 1, wherein an annular groove formed in the outer surface of said bush and said roving sections seated against the outer surface of said bush within said groove.

7. A connecting element, as set forth in claim 2, wherein said bush is eccentrically disposed relative to the center of said boundary line.

8. A connecting element, as set forth in claim 1, wherein said roving is formed of glass.

9. A connecting element, as set forth in claim 1, wherein said roving is formed of carbon.

10. A connecting element, as set forth in claim 1, wherein said roving is formmed of boron.

11. A connecting element, as set forth in claim 1, wherein said roving is formed of graphite.

12. A connecting element, as set forth in claim 1, wherein said roving is formed of plastic.

13. A connecting element, as set forth in claim 1, wherein said roving is formed of metal.

14. A connecting element, as set forth in claim 1, wherein said synthetic resin impregnating said roving comprises 100 parts by weight of a hardenable epoxy resin and 25 parts by weight of a hardener.

15. A structural member comprising a structural part having an opening therethrough, a bush having a central axis, said bush being inserted for a portion of the axial length thereof into the opening in said structural part, said bush having a circumferential outer surface extending in the direction of its central axis, a multiplicity of roving sections impregnated with synthetic resin each contacting the circumferential outer surface of said bush and extending chordally outwardly from opposite sides of said bush and terminating at spaced points along an endless boundary line spaced outwardly from and extending around said bush, the oppositely extending sections of each said roving being angularly disposed relative to one another.

16. A connecting element formed by the method comprising inserting bushes into the opposite sides of a rotating disk having an arcuate circumferential periphery with the axis of the bushes being coaxial with the axis of rotation of the disk and with each of the bushes projecting outwardly from a different one of the opposite sides of the disk, removing a roving from a source of supply, passing the roving through a synthetic resin bath and guiding the roving into holding engagement with the circumferential periphery of the disk so that it remains in stationary contact with the circumferential periphery and passes over one side of the disk while rotating the disk for a selected angular distance so that the roving extends inwardly from the point of holding engagement with the circumferential periphery of the disk into contact with the circumferential periphery of the bush located on one side of disk, when the disk has completed its rotation through the selected angular distance, moving the roving being fed to the disk at a location spaced outwardly from the circumferential periphery of the disk in the axial direction of the bushes so that it contacts the circumferential periphery of the disk in holding engagement therewith at the selected angular distance of rotation from the immediately preceding point of holding engagement with the circumferential periphery of the disk and passes over the other side of the disk while rotating the disk through the selected angular distance so that the roving extends inwardly from the point of holding engagement with the circumferential periphery of the disk into contact with the circumferential periphery of the bush located on the other side of the disk and repeating the steps until the desired winding of the roving on the disk has been completed, when the winding has been completed cutting the roving around the circumferential periphery of the disk to form two connecting elements each comprising one bush and the sections of the rovings located on the same side of the disk with the one bush, and removing the connecting elements from each side of the disk.

17. A connecting element, as set forth in claim 16, including the further step of securing at least one of the connecting elements to a structural part by inserting the bush of the connecting element into the structural part and joining the sections of the rovings extending outwardly therefrom to the structural part.

18. A connecting element, as set forth in claim 16, including applying a number of layers of the roving to each side of said disk and decreasing the thickness of the layers of roving from the bush toward the circumferential periphery of the disk.

19. A connecting element, as set forth in claim 18, comprising shaping the circumferential periphery of the disk in accordance with the direction of the forces transmitted between the roving and the structural part.

20. A connecting element, as set forth in claim 16, comprising varying the number of lengths of roving applied to each side of the disk and varying the type of material used for the roving and for the synthetic plastic in accordance with the forces to be introduced to the structural part.

21. A connecting element, as set forth in claim 16, including forming an annular groove in the outer surface of said bushes and seating the roving sections against the outer surface of said bushes within said grooves.

22. A connecting element, as set forth in claim 16, wherein the circumferential periphery of said disk is circular.

23. A connecting element, as set forth in claim 16, wherein the circumferential periphery of said disk is elliptical.

24. A connecting element, as set forth in claim 16, wherein the roving is formed of glass.

25. A connecting element, as set forth in claim 16, wherein the roving is formed of carbon.

26. A connecting element, as set forth in claim 16, wherein the roving is formed of boron.

27. A connecting element, as set forth in claim 16, wherein the roving is formed of graphite.

28. A connecting element, as set forth in claim 16, wherein the roving is formed of plastic.

29. A connecting element, as set forth in claim 16, wherein the roving is formed of metal.

30. A connecting element, as set forth in claim 16, wherein the synthetic resin bath contains a synthetic resin comprising 100 parts by weight of a hardenable resin and 25 parts by weight of a hardener.

* * * * *